US010233905B2

(12) United States Patent
Michaud et al.

(10) Patent No.: US 10,233,905 B2
(45) Date of Patent: Mar. 19, 2019

(54) WIND TURBINE GEARBOX LUBRICATION SYSTEM

(75) Inventors: Mark D. Michaud, Austin, TX (US); Gary J. Sroka, Missouri City, TX (US); Ronald E. Benson, Spring, TX (US); Lane Winkelmann, New Ulm, TX (US)

(73) Assignee: REM Technologies, Inc., Brenham, TX (US)

( * ) Notice: Subject to any disclaimer, the term of this patent is extended or adjusted under 35 U.S.C. 154(b) by 160 days.

(21) Appl. No.: 14/354,843

(22) PCT Filed: Oct. 28, 2011

(86) PCT No.: PCT/US2011/058441
§ 371 (c)(1),
(2), (4) Date: Jul. 9, 2014

(87) PCT Pub. No.: WO2013/062594
PCT Pub. Date: May 2, 2013

(65) Prior Publication Data
US 2014/0314569 A1    Oct. 23, 2014

(51) Int. Cl.
 *F03D 15/00*  (2016.01)
 *F03D 80/70*  (2016.01)
(Continued)

(52) U.S. Cl.
CPC .......... *F03D 15/00* (2016.05); *C10M 171/02* (2013.01); *F03D 80/70* (2016.05);
(Continued)

(58) Field of Classification Search
CPC ...... F03D 15/00; F03D 80/70; F16H 57/0401; F16H 57/0402
See application file for complete search history.

(56) References Cited

U.S. PATENT DOCUMENTS 4,855,044 A * 8/1989 Calloni .................. C10G 31/09
 210/195.1
5,129,482 A * 7/1992 Warner ................. F16N 19/006
 184/104.3
(Continued)

FOREIGN PATENT DOCUMENTS

AU  2010226900 A1   8/2011
DE  102010028195 A1  10/2011
(Continued)

OTHER PUBLICATIONS

PCT Application No. US2011/058441; International Report on Patentability for Applicant REM Technologies, Inc. dated Mar. 17, 2014.
(Continued)

*Primary Examiner* — Minh Truong
(74) *Attorney, Agent, or Firm* — Jones Walker LLP

(57) ABSTRACT

A wind-turbine gearbox system includes an input gear stage having mating gear surfaces finished to a surface roughness of less than 0.25 micron and at least one bearing supporting the input gear stage. A lubrication circuit is arranged to deliver lubricant to the input gear stage and the bearing during operation of the wind-turbine and includes an inline filter for removal of particles of less than 2 micron from the lubricant prior to delivery. A lubricant for use in the system may have a relatively low viscosity compared to conventional wind turbine gearbox lubricants.

31 Claims, 1 Drawing Sheet

(51) Int. Cl.
*F16H 57/04* (2010.01)
*C10M 171/02* (2006.01)

(52) U.S. Cl.
CPC . *F16H 57/0402* (2013.01); *C10M 2203/1006* (2013.01); *C10M 2205/0285* (2013.01); *C10N 2230/40* (2013.01); *C10N 2230/42* (2013.01); *C10N 2230/43* (2013.01); *C10N 2230/44* (2013.01); *C10N 2240/04* (2013.01); *F05B 2260/98* (2013.01); *F05B 2280/5011* (2013.01); *F16C 2360/31* (2013.01); *Y02E 10/722* (2013.01)

(56) References Cited

U.S. PATENT DOCUMENTS

| | | | |
|---|---|---|---|
| 7,546,842 B2* | 6/2009 | Llorente Gonzalez | F01M 11/04 134/111 |
| 7,863,767 B2* | 1/2011 | Chapple | F03D 7/02 126/247 |
| 8,710,693 B2* | 4/2014 | Amano | F03D 1/001 290/55 |
| 8,997,934 B2* | 4/2015 | Nielsen | F03D 11/0008 184/4 |
| 9,328,720 B2* | 5/2016 | Caldwell | F04B 1/00 |
| 2005/0014597 A1 | 1/2005 | Michaud et al. | |
| 2005/0034925 A1* | 2/2005 | Flamang | F16H 57/0402 184/6.12 |
| 2008/0139425 A1 | 6/2008 | Hutchison et al. | |
| 2009/0139799 A1* | 6/2009 | Tiwari | F16H 57/0431 184/6.12 |
| 2009/0298732 A1 | 12/2009 | Hoste et al. | |
| 2010/0032959 A1* | 2/2010 | Nies | F03D 15/00 290/55 |
| 2010/0109334 A1* | 5/2010 | Nies | F03D 80/70 290/55 |
| 2011/0118071 A1* | 5/2011 | De Maziere | F16H 37/086 475/114 |
| 2011/0147322 A1* | 6/2011 | Payne | F01D 25/18 210/805 |
| 2013/0049371 A1* | 2/2013 | Stein | F03D 15/20 290/55 |
| 2013/0336764 A1* | 12/2013 | Schmidt | F01M 5/00 415/110 |

FOREIGN PATENT DOCUMENTS

| | | |
|---|---|---|
| EP | 1518919 A1 | 3/2005 |
| EP | 2103336 A1 | 9/2009 |
| EP | 2246562 A2 | 11/2010 |
| EP | 2345749 A1 | 7/2011 |
| JP | 2000257697 A | 9/2000 |
| JP | 2003269553 A | 9/2003 |
| JP | 2005207517 A | 8/2005 |
| JP | 2010194638 A | 9/2010 |
| JP | 2011051541 A | 3/2011 |
| WO | 2009148940 A2 | 12/2009 |
| WO | 2013062594 A1 | 5/2013 |

OTHER PUBLICATIONS

EPO Application No. 11 781 937.5 (Wind Turbine Gearbox Lubrication System)—Examiner's Action dated Oct. 18, 2016.

* cited by examiner

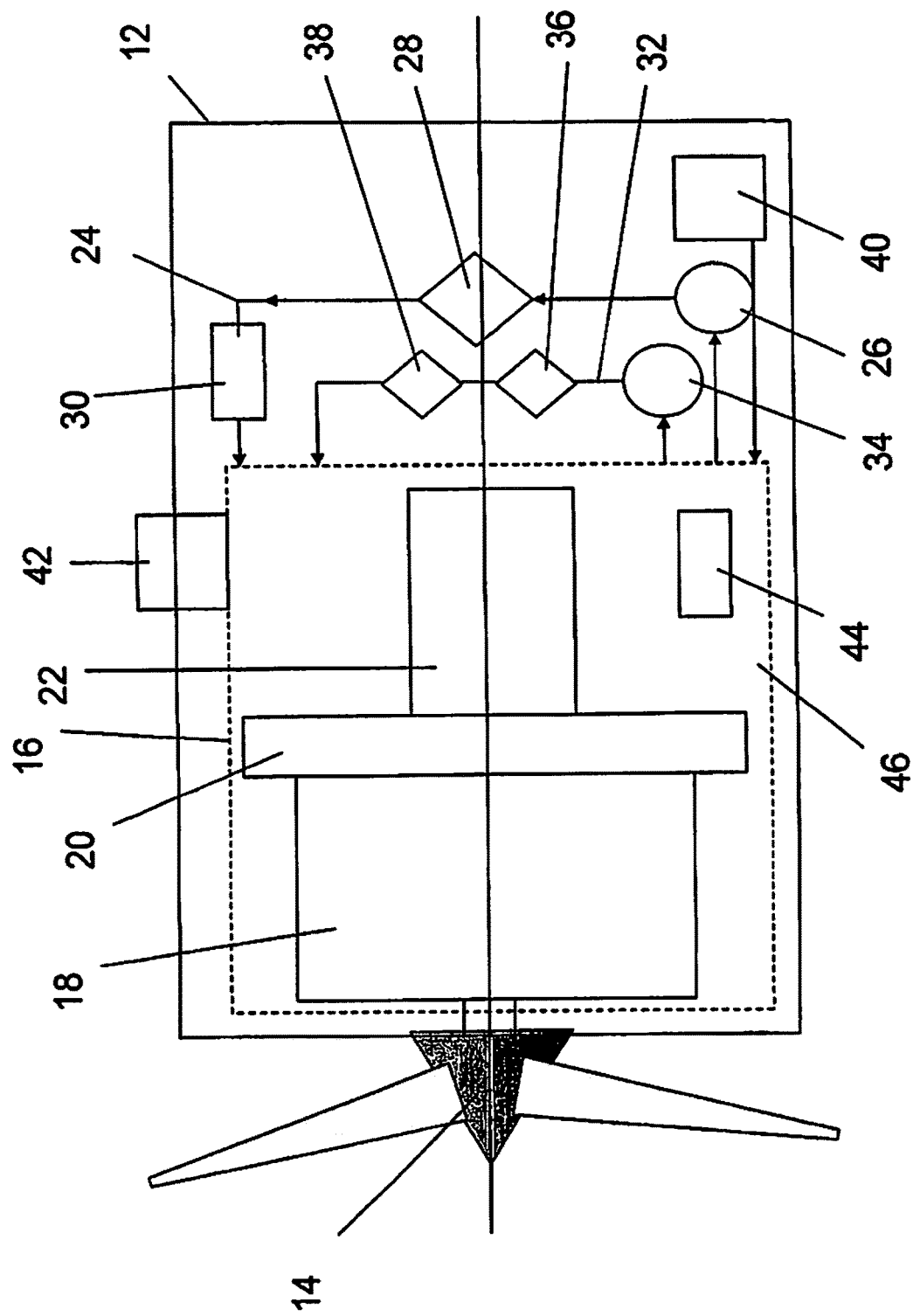

WIND TURBINE GEARBOX LUBRICATION SYSTEM

BACKGROUND OF THE INVENTION

1. Field of the Invention

The invention relates generally to the lubrication of gearboxes and more particularly to systems for improving lubrication in relation to large wind turbine gearboxes having superfinished components.

2. Description of the Related Art

Engineering components in moving contact with one another generally require lubrication in order to prevent or reduce friction, heat and wear. The greater the load, speed or period of movement, the more critical is the lubrication. Gears, bearings and cams are all examples of engineering components that may be designed for thousands of hours of continuous operation. Only with correct lubrication can such operation be successfully achieved. Various principles of lubrication exist, including air bearings, hydrodynamic lubrication and particulate lubrication. The present invention is concerned with liquid lubrication in the form of oils, both natural and synthetic.

Complex engineering components often operate as part of a system, such as an engine, gearbox or differential. These systems may be provided with lubrication that fulfils all of the requirements of the whole system. Often this will entail providing a supply of lubricant that circulates through the system. The lubricant must be carefully chosen in order to provide adequate lubrication to the different components. Often this choice is a compromise as one component may require one form of lubricant while a different type of lubricant may be more suited to another component. The lubricant must also be chosen with particular operating conditions in mind. Operation of the system outside the preferred range of load, speed or temperature may lead to less than adequate lubrication. Inadequate lubrication may lead to boundary lubrication conditions, contact fatigue and eventually rough cleavage of peak asperities (micropitting) from the metal surface. Cleaved metal asperities, or particles and especially particles larger than 1 micron contaminate the lubricant and accelerate the wear process. In particular, such particles may be extremely detrimental to the bearings which generally operate with a lower film thickness to that of the gears.

Consequently, gear life is shortened and premature catastrophic gear failure may occur. In an attempt to make lubricants more suited to a range of conditions, additive packages may be added to a base oil to improve its performance. These additives may however themselves be sensitive to certain conditions and can become ineffective or even detrimental. They are also often environmentally undesirable.

One factor that determines the lubrication regime of a given component is the surface roughness of the contact surfaces. Recent advances in finishing techniques have allowed engineers to achieve smoother surfaces than were previously possible. An additional factor is the nature of the finished surface. Ground or honed surfaces may have a relatively symmetrical roughness profile in which peaks and troughs are present in equal numbers. Other polishing and finishing techniques may achieve a planarized surface in which primarily the peak asperities have been removed. Planarized surfaces may be characterized by a material ratio (Rmr) of greater than 50% and are generally recognized as having better load bearing capacity than a symmetrical surface of similar roughness. In particular, superfinishing techniques are now available that are capable of providing mirror-like smoothness even to relatively large and complex components. In the following, the terms "superfinishing" and "superfinished surfaces" will be used to denote surface finishes with a roughness (Ra) of 0.25 microns or less, irrespective of the manner in which the surface finish is achieved. However, it must be noted that Ra cannot distinguish between a surface that is planarized versus a surface that is ground or honed. Those trained in the art will understand that alternative tribological parameters such as Rpm (mean peak height) may better distinguish a planarized surface from a ground or honed surface. Moreover, mathematical descriptions such as the lambda ratio may be defined using those alternative parameters.

Various theories exist regarding the correct lubrication for use with superfinished components but in general, such surfaces operate outside the accepted ranges where tried and trusted traditional results apply. According to US Patent Publication No. 2009/0151494, it may be advantageous to apply a higher viscosity lubricant to superfinished surfaces in order to improve their high-temperature operation without sacrificing lubricant film strength. In a further US Patent Publication No. 2009/0137436, a complex additive package is disclosed that may be used to improve load carrying capacity and enhance surface fatigue life of mechanical components, including those that have superfinished surfaces.

An additional function that a lubricant may perform is the removal of debris that may be formed by wearing of surfaces or as a consequence of foreign objects. Circulation of the lubricant through a filter allows such debris to be removed, preventing further damage to the system. In theory, it would be desirable to have a filter capable of removing all particles sufficiently large to cause damage to the system. Particles having a size greater than the operational lubricant film thickness may be considered potentially harmful. Nevertheless, it is not always simple to remove them from the system since the finer the filter, the more difficult it is to circulate a lubricant through it. The lubricant film thickness will also be at least partially dependent upon the oil viscosity. As the viscosity increases, the system may become tolerant of larger debris but the filtering of such debris becomes more difficult due to the resistance of the filter to flow.

Additionally, parasitic frictional losses increase as a result of greater lubricant viscosity. These in turn generate heat which causes the system to run hotter or require additional oil cooling capacity. Additional additives may be required specifically to compensate for such higher temperatures or otherwise offset the consequences of high viscosity, in particular under cold-start conditions. In general, the lifetime of a lubricant is strongly dependent upon temperature. Exposure to elevated temperatures can result in lubricant deterioration due to e.g. thermal oxidation.

Lubricants circulating in a lubrication system also tend to entrain air. Air bubbles or inclusions are generally undesirable both due to the tendency to cause foaming but also because the presence of air inclusions can reduce the strength of the lubricant film. Higher viscosity lubricants have greater tendency to entrain air than those of lower viscosity. In this context too, further additives may be provided to the additive package in an effort to counteract the effect of air bubbles or to prevent them from occurring.

One particular area of operation is the field of wind turbine gearboxes. These systems are becoming ever bigger and turbines presently being installed may typically be rated at more than 1 MW. A significant characteristic of such machines is that the gearbox input stage operates at very low speeds (rotor speeds between 5-10 RPM). This corresponds to input stage sun pinion speeds of 30-60 RPM in a typical 1.5 MW epicyclic gear input stage with a gear ratio of approximately 6.14. While the high speed output stage may rotate at 1500 RPM or above. The gears and bearings are highly loaded and operate under extremely harsh conditions that are unique to the wind power industry. The lubricant package plays a critical role in ensuring that these gearboxes have a service life of more than twenty years. The volume of lubricants used in each gearbox is greater than 200 liters and unlike the short interval of oil changes in a car, wind turbines must operate for 25,000 to 50,000 hours between lubricant changes. Changing the lubricant is also no easy chore since the gearboxes are located atop towers that can extend more than one hundred meters above the ground often located in harsh climates and remote regions on high terrain or offshore.

The presently approved lubricant viscosity for most large wind turbines is at least ISO viscosity grade (ISO VG) 320. The ISO VG scale is a globally recognized standard for kinematic viscosity in units of $mm^2/s$, measured at 40° C. Henceforth, all references to viscosity are made on the ISO VG basis. The approved viscosity is a significant compromise, since it may in fact be too low for the low speed input stage and is generally considered too high for high speed gear stages and especially the bearings. The high speed bearings of 1.5 megawatt turbines and larger operate under very tight tolerances. High viscosity lubricants restrict proper bearing rolling and promote frictional heating and wear. It would also be desirable to filter particulates down to below 3 microns. Nevertheless, for high viscosity lubricants, filters of such fineness are often ineffective and once initial run-in has been carried out may be replaced by 10 micron filters. The American Gear Manufacturers Association publication ANSI/AGMA/AWEA 6006-A03 "Standard for Design and Specification of Gearboxes for Wind Turbines" specifies a 10 micron inline filter with automatic bypass for plugged filter and cold start conditions. Additional, finer filters of 3 microns may be used in an offline configuration but these cannot guarantee full removal of all particulates.

The presently recommended wind turbine gearbox lubricants are composed of base oil and a relatively high concentration of additives. The base oil can be mineral oil based or synthetic. The additives may be provided to improve shear and thermal oxidation stability and to prevent sludge deposits, reduce wear, micropitting, scuffing, foaming, corrosion and bacterial growth. In particular anti-wear, anti-micropitting and anti-scuffing additives may be added in order to compensate the insufficient viscosity for the low-speed stage. Formulating such a lubricant is a daunting task given the multitude of additives that are added to accomplish the above objectives. The formulator must be knowledgeable of the additive chemistry, the chemical interaction between the various additives, and their reaction with the various copper and steel alloys present in the gearbox. The formulation of lubricants is a balancing act, since certain additives are reactive with the metal surfaces, oxygen, and even the other additives. Zinc alkyldithiophosphate additives (ZDDP) are well known examples of compounds that react negatively with certain metal surfaces and can promote micropitting.

By their nature the additives used are not always environmentally friendly and leaks to the environment would be damaging to the green image of the wind power industry. In particular, sulfur and phosphorous are damaging to the environment. Additionally sulfur and phosphorous containing additives may damage gearboxes by promoting micropitting and corrosion. Scientists, engineers and formulators continuously search for compounds that improve antiwear, anti-micropitting, anti-scuffing, extreme pressure, and anti-oxidant properties of commercial lubricants while reducing or even eliminating phosphorous and sulfur containing compounds. However this often leads to even more complex additives using additional compounds and processes.

For example, U.S. Pat. No. 7,759,294 B2 mentions that the use of hydrocarbylamine with alkylphosphorothioate enhances the "load carrying capacity" capabilities of the lubricant. Furthermore, U.S. Pat. No. 7,612,025 B2 mentions that the use of an alkali or alkaline earth metal salicylate based and/or overbased salt, up to 0.15 percent boron by mass and reduced sulfur content of 0.3 percent or less by mass in conjunction with a phosphorous containing antiwear agent such as ZDDP improves the antiwear properties of the lubricant.

Further US Patent Application 2006/0276355 A1 claims that mixing two lubricants one of viscosity preferably less than 10 cSt and one preferably greater than 100 cSt and having common antiwear, anti-micropitting, anti-scuffing, extreme pressure, and anti-oxidant, anti-corrosion and anti-foaming additives decreases micropitting. According to the example given, the lubricants are formulated to ISO VG 320 as recommended by wind turbine gearbox manufacturers.

It would be desirable to eliminate or reduce the concentration of certain additives to create a simpler and more environmentally friendly lubricant. It would also be desirable to operate gearboxes with cleaner oil having a lower upper size limit for particulate debris.

BRIEF SUMMARY OF THE INVENTION

The present invention addresses these and other problems by providing a wind-turbine gearbox system comprising: an input gear stage having mating gear surfaces finished to an average surface roughness (Ra) of 0.25 micron or less; a low-speed bearing supporting the input gear stage; a lubrication circuit arranged to deliver lubricant to the input gear stage and the low-speed bearing and comprising an inline filter having a nominal pore size for removal of particles greater than 2 micron, preferably greater than 1 micron, from the lubricant prior to delivery. Henceforth, references to surface roughness will be to the parameter Ra, representing the arithmetic average of the absolute values of vertical deviations from the mean. The discipline of measuring surface roughness is referred to as profilometry and the instrument is referred to as a profilometer. The surface roughness may be measured by various types of instrumentation including mechanical, or stylus profilometry and optical profilometry. In the present specification a mechanical type profilometer with a 5 micron tip stylus is used to determine the surface roughness of the final finished surface. The final Ra is not taken from one measurement but from at least 10 measurements in a variety of locations and on several tooth flanks between root fillet and the addendum, more preferably just below the pitch line. An average measurement of 0.25 micron utilizing the said stylus type is accurate and precise without regard to the age, brand, or model of the profilometer since, as with most analytical instruments, an internationally recognized standard method of calibrating and measuring exists. The present invention utilizes the International Organization of Standardization (ISO) publications ISO 4287:1997/Amd 1:2009, ISO 4288: 1996/Cor 1:1998, and ISO 5436-1:2000 as a guideline to calibrate the profilometer and to determine the final finished surface roughness. Furthermore, reference to nominal pore size or filter rating will henceforth be based on a $\beta_{x[c]} \geq 1000$. For such filters, the $\beta_{x[c]}$ value is defined in the equation below.

$$\beta_{x[c]} = \frac{x(N_U) \geq x\mu m}{x(N_D) \geq x\mu m}$$

This is the ratio of the number of particles (N) greater than a given size "x" upstream (U) of the filter to the number of particles (N) of that size downstream (D) of the filter. The skilled person will understand that a filter having a rating of 2 microns $\beta_{2[c]} \geq 1000$ might also serve to remove particles of 1 micron with a rating $\beta_{1[c]} \geq 100$.

According to the invention it has been found that by finishing at least the low-speed input gear stage to a roughness value as indicated above, lower viscosity oil may be used than is conventionally recommended while maintaining a sufficient film thickness to ensure good lubrication. Without wishing to be bound by theory, it is believed that for a superfinished gear tooth surface having a surface roughness equal to or below 0.25 micron, mixed or even full elastohydrodynamic lubrication (EHL) conditions may be maintained at low pitch line velocities of approximately 30-60 rpm as generally encountered in the input stage. In order to maximize operating efficiency while maintaining EHL conditions, the coefficient of friction must be as low as possible. This corresponds generally to a ratio of film thickness to surface roughness range of approximately between 1 and 3, depending upon the nature of the surface. This dimensionless $\lambda$ ratio is defined as:

$$\lambda = \frac{h_{min}}{(R_{a1}^2 + R_{a2}^2)^{0.5}}$$

According to Dowson and Higginson (D. Dowson, Elastohydrodynamics, Paper No. 10, Proc. Inst. Mech. Eng., Vol. 182, PT3A, 1967, p 151-167) the minimum film thickness $h_{min}$ may be calculated:

$$h_{min} = \frac{1.63\alpha^{0.54}(\mu_0 V_e)^{0.7}\rho_n^{0.43}}{(X_\Gamma w_{N_r})^{0.13} E_r^{0.03}}$$

It is important to recognize that $\lambda$ may only be used as an approximation in the case of planarized surfaces. Unlike ground or honed surfaces, in the case of planarizing, almost all peak asperities are removed leaving only "valleys" or "troughs" on the surface. Consequently, peak-to-peak interaction is almost non-existent. Thus, traditional boundary lubrication conditions involving peak-to-peak interactions that result in contact fatigue, micro-pitting, pitting and even scuffing are negligible even for films thin enough to yield $\lambda \leq 1$, normally associated with boundary lubrication condition. Without wishing to be bound by theory, it is presently conjectured that for a planarized surface, a specific film thickness having $1 < \lambda < 3$ may provide full EHL operation with little probability of wear related distress for the low speed stage.

The minimum required viscosity may be estimated for a given $\lambda$ ratio and surface roughness given the aforementioned equations. The entraining velocity, lubricant viscosity, and pressure-viscosity coefficient have the most significant effects on $h_{min}$ according to Errichello, RE, Friction, Lubrication, and Wear of Gears, ASM Handbook, Volume 18: Friction, Lubrication, and Wear Technology, p. 535-545.

Therefore, the required dynamic viscosity (based on the parameters listed in Table 1) may be defined as:

$$\mu_0 = \frac{1}{V_e}\left[\frac{\lambda(R_{a1}^2 + R_{a2}^2)^{0.5}(X_\Gamma w_{N_r})^{0.13} E_r^{0.03}}{1.63\alpha^{0.54}\rho_n^{0.43}}\right]^{1.43}$$

TABLE 1

List of Parameters

| Parameter | Units, SI | Definition |
|---|---|---|
| $\lambda$ | Dimensionless | Ratio of film thickness to surface roughness |
| $h_{min}$ | M | Minimum film thickness |
| $R_a$ (or Ra) | M | Arithmetic average surface roughness |
| $\alpha$ | m2/N | Pressure viscosity constant |
| $\mu_0$ | ISO VG | Dynamic viscosity |
| $V_e$ | m/s | Entrainment velocity |
| $\rho_n$ | M | Radius of curvature |
| $X_\Gamma$ | Dimensionless | Load sharing factor |
| $w_{Nr}$ | kNm | Normal unit load |
| $E_r$ | dimensionless (based on elastic modulus of alloy) | Reduced modulus of elasticity |

Various sources report a variety of theoretically and empirically derived equations and approximations. Based on the above calculation for dynamic viscosity and empirically determined base line values, the Table 2 below discloses an estimation of dynamic viscosities based on a surface roughness of 0.25 microns for different operational speeds and different conjectured values of lambda for a 1.5 MW wind turbine low speed stage sun pinion. Calculations were specifically determined using a sun pinion with a pitch diameter d of approximately 0.266 meters and a radius of curvature $\rho_n$ of 0.046 meters.

TABLE 2

Estimated Viscosities for Different Speeds to Achieve Desired Lambda Values

| Input Rotational speed, rpm | Entrainment velocity, ($V_e$), m/s | Desired Lambda Ratio | Required Viscosity, ISO VG Grade |
|---|---|---|---|
| 60 | 1.52 | 2.5 | 182 |
| 60 | 1.52 | 2.0 | 132 |
| 60 | 1.52 | 1.5 | 88 |
| 50 | 1.27 | 2.0 | 159 |
| 50 | 1.27 | 1.5 | 105 |
| 50 | 1.27 | 1.0 | 59 |
| 40 | 1.02 | 2.0 | 199 |
| 40 | 1.02 | 1.5 | 132 |
| 40 | 1.02 | 1.0 | 74 |
| 30 | 0.76 | 2.0 | 265 |
| 30 | 0.76 | 1.5 | 175 |
| 30 | 0.76 | 1.0 | 98 |
| 20 | 0.51 | 1.0 | 147 |

In addition to increasing the operational efficiency of the wind turbine, the reduction in viscosity of the lubricant allows a finer inline filter to be employed. A heavy lubricant is difficult to pass through a fine filter and incurs significant pressure losses. In general inline filters are provided with a bypass that can open in response to excess pressure drop across the filter. Once the bypass opens e.g. during cold-start conditions or on clogging, the filter ceases to be effective in removing debris. Subsequent contamination can pass directly to the gear and bearing surfaces. According to the present invention, a finer filter may be used during normal operation with less risk of clogging. By removing a greater quantity of finer particles from the oil, potential damage to critical surfaces within the gearbox may be further reduced. Since damage due to debris leads on to further debris, the vicious circle may be broken and the lubricant and filters may have a significantly increased useful life. In this context, an inline filter is considered to be one that is active during commissioned use of the wind turbine gearbox and not one that is merely present for run-in purposes and thereafter bypassed or otherwise obsolete.

The invention is preferably applicable to large wind turbine gearboxes rated to above 1 MW or even above 1.5 MW. In general, such gearboxes will have an input planetary stage or epicyclic gear although other configurations would also be expected to benefit from the teaching of the invention. Additionally, while the invention is directed to gearboxes in which the input gear stage is finished to the desired roughness, further parts of the gearbox including the high-speed gears and the bearings may also be beneficially provided having similarly smooth finishes of 0.25 microns or less.

According to a further aspect of the invention, the system also includes a magnetic particle filter, preferably located in a sump area of the gearbox. For operation with lubricants of lower viscosity than is conventional, such magnetic filters can effectively remove ferrous particulate material from the lubricant, reducing the load on other filters present in the system.

Another aspect of the invention comprises the use of a lubricant with a reduced additive package in conjunction with the above system. Superfinishing of at least the low speed gears allows a less viscous lubricant to be used. The resulting gearbox can operate at a significantly lower temperature, reducing or eliminating thermal degradation and oxidation of the lubricant. Micropitting and scuffing may also be substantially reduced or eliminated. Consequently, anti-wear, anti-micropitting, anti-scuffing and thermal/oxidation additives can be drastically reduced or eliminated from the additive package. It is also generally accepted that smooth surfaces are less prone to corrosion and the concentration of corrosion inhibitors may also be reduced. In particular, it is believed that by matching the smoothness of relevant surfaces to the chosen lubricant viscosity, a more balanced lubrication system may be achieved.

According to an important aspect of the invention, there may be provided a lubricant for use in wind turbines as described above, having an ISO VG of between 68 and 320, preferably between 100 and 220 and more preferably around 150. Lubricants for gears comprise base oil and an additive package concentrate that is mixed into the base oil. The additive concentrate comprises additive compounds and may also comprise diluent or solvent or solvent oil. Lubricants may contain up to 99 percent or more of the base oil. The base oil may be mineral oil based or synthetic oil based. Examples of synthetic base oils include polyalphaolefins (PAO), polyalkene glycols (PAG) and esters. Moreover, the base oils may comprise mixtures of mineral base oils, mixtures of synthetic base oils or mixtures of both synthetic and mineral base oils. The skilled person is well aware of the relative advantages of these alternatives. The solvent oil functions as a solvent for the additive package concentrate that is later mixed with the base oil. The solvent oil may comprise up to 99 percent or more of the diluted additive package. As well, the solvent oil may be mineral oil based or synthetic based. Additive compounds perform a variety of functions in a lubricant depending on the active chemical element and/or the molecular structure of the compound. The specific functions and interactions are discussed in detail in Lubricant Additives: Chemistry and Applications, Leslie R. Rudnick, CRC Press, 2003. Henceforward, the weight percentages of the additives are described as a weight percentage of the final lubricant.

Antiwear, anti-scuffing, anti-micropitting and extreme pressure compounds represent the most common additives used in lubricants. Under boundary lubrication conditions peak-to-peak asperities of the gear mating surfaces are able to interact. This physical interaction under inadequate lubrication increases friction and causes the operating temperature to rise. In situations where little or no lubrication exists maximum peak-to-peak surface contact or extreme pressure is achieved. Both antiwear and extreme pressure additives thermally decompose forming thin layers on the metal surface. These chemically active thin layers "preferentially shear" under boundary lubrication conditions thus protecting the mating surfaces from metal-to-metal contact. Examples of antiwear, anti-scuffing, anti-micropitting and extreme pressure additives include sulfur and phosphorous containing compounds such as zinc dialkyldithiophosphate compounds (ZDDP). Detailed examples are outlined in US Patent Application 2010/0016188 A1. Other antiwear, anti-scuffing and anti-micropitting additives may comprise boron containing compounds.

Anti-oxidants represent another common additive included in a lubricant package. Lubricant oxidation occurs at elevated temperatures in the presence of oxygen. The oxidized hydrocarbon based oil polymerizes and thickens eventually forming sludge, varnish and resins. Moreover, the reduced oxygen forms unstable peroxy radicals that react to form corrosive carboxylic acids that may further react with the lubricant, additives, or the metal surfaces of the gears and bearings. Radical scavengers and hydroperoxide decomposers are two classes of oxidation inhibitors. Nitrogen based aryl amines and oxygen based phenols and hindered phenols are two examples of radical inhibitors. Hydroperoxide inhibitors may contain sulfur, phosphorous or both. The most common examples are ZDDP compounds. Specific examples of phenolic oxidation inhibitors include 2,6-di-tertbutylphenol and 2,4,6-tri-tertbutylphenol. Other antioxidant additives may include molybdenum containing compounds such as molybdenum dithiocarbamates, sulfurised olefins and alkylated diphenylamines such as octyl diphenylamine. Molybdenum containing compounds may be used in friction modifying additives as well.

Anti-foaming agents represent another component of the additive package. Air and gas entrainment often occurs in oils of high viscosity and especially in oils with high concentrations of additives. Entrainment leads to the formation of bubbles and foaming. Foams reduce oil pressure and lead to cavitation of the oil film on the metal surfaces especially the bearing surfaces. Inadequate lubrication accelerates mechanical wear mechanisms such as contact fatigue and scuffing. Dimethylsiloxane polymers, alkylmethacrylate polymers and alkylacrylate copolymers are three classes of defoaming or anti-foaming additives or agents. These additives, used in small quantities of often less than 20-30 ppm (parts per million), reduce the surface tension around forming bubbles allowing them to burst. Unfortunately, many anti-foaming agents have a detrimental effect on filters, causing clogging and excess pressure buildup. Such additives represent a limitation on the ability to adopt finer particulate filters. Examples of defoaming agents include glycerol monostearate, polyglycol palmitate, benzoylacetone, methyl salicylate, glycerol monooleate, glycerol dioleate and polyacrylates A typical lubricant additive package for use in a conventional wind turbine gearbox may comprise 0.40 percent of an antiwear compound such as zinc di-(1,3-dimethylbutyl) dithiophosphate or similar ZDDP compound. These compounds may also act as antiwear, anti-scuffing, anti-micropitting and extreme pressure agents. In addition the additive package may comprise 0.20 percent of sulfur containing extreme pressure compound such as di-tert-butyl trisulfide, 0.050 percent of anti-oxidant such as 4,4'-bis(2-methyl-6-tert-butylphenol) and approximately 20 ppm of an antifoaming agent such as glycerol monostearate. The final lubricant oil may comprise other additives such as dispersants, detergents, and anti-corrosion agents. Specific examples of common lubricant additives are described in U.S. Pat. No. 7,759,294 B2.

According to one aspect of the present invention the surfaces are planarized to achieve the surface roughness (Ra) value of 0.25 micron or less. More preferably, using a planarizing process an average mean peak height (Rpm) value of 1.00 micron and more preferably 0.5 micron or less may be achieved. Rpm is measured as the average value of the five highest peaks above the median in five consecutive sample lengths (le) taken over an assessment length of the profile and is believed to be more representative of the interaction between roughness and lubrication film thickness. Peak asperities that contribute to wear under boundary lubrication conditions are removed during planarizing and a mixed or full EHL regime is maintained. The lower coefficient of friction due to EHL conditions result in lower operating temperatures, typically below the activation temperatures of antiwear, anti-scuffing, extreme pressure and anti-micropitting additives. Hence these additives may be reduced or even eliminated from the lubrication additive concentrate. Moreover, oxidation is limited at lower temperatures. Thus the anti-oxidant additive concentration may be reduced or eliminated. In particular, the surfaces may be planarized by a chemically accelerated vibratory finishing (CAVF) process. Such processes use active chemistry to produce a relatively soft conversion coating on the relevant surfaces. The active chemistry may be as supplied for the REM® process by REM Chemicals of Brenham Tex. and may be added to a vibratory tub or bowl containing a combination of abrasive and/or non-abrasive media in which the gear is to be finished. Agitation of the gear in the media causes removal of the conversion coating from prominent areas of the gear surface, while hollows and valleys are undisturbed. The CAVF process will not be described further herein as it is generally well documented in various publications including U.S. Pat. Nos. 4,491,500 and 4,818,333, the contents of which are hereby incorporated by reference in their entirety.

In another aspect of the invention, a lower lubricant viscosity is required to maintain the minimum required film thickness and to maintain mixed EHL. Therefore, antifoaming additives may be essentially eliminated due to the reduced lubricant viscosity and to the reduced or eliminated antiwear, anti-scuffing, anti-micropitting, extreme pressure and anti-oxidant additives.

In yet another aspect of this invention since peak asperities are removed mixed or full EHL can be maintained with a minimum film thickness. Under normal operating conditions, this film is homogeneous and free of cavitations that may lead to boundary lubrication and a higher coefficient of friction. Therefore, friction modifying compounds may be reduced or more preferably eliminated.

The additive package according to this invention comprises a reduced amount or none of any or all of the following: antiwear, anti-scuffing, anti-micropitting, extreme pressure, anti-foaming, anti-oxidation/oxidation inhibitor and friction modifying compounds. General examples of each class of additive compounds that may be reduced include: an antiwear, anti-corrosion, and extreme pressure compound comprising both sulfur and phosphorous and/or containing zinc or boron; an extreme pressure compound comprising sulfur; an antiwear compound comprising phosphorous, such as zinc dialkylditihiophosphate (ZDDP); a friction modifying compound comprising an alkylene amine compound, molybdenum, or both; a dispersant compound containing basic nitrogen; and antioxidants comprising an aryl amine. Moreover, antifoaming or defoamant agents comprising any or all of the following: dimethylsiloxane polymers, alkylmethacrylate polymers, alkylacrylate copolymers may be completely or essentially eliminated. As a consequence of the removal of such antifoaming additives, significantly finer particle filters may be used effectively without increasing operational losses.

In a preferred embodiment, the lubricant comprises a zinc, boron, sulfur and/or phosphorous containing antiwear, anti-scuffing, anti-micropitting system or agent that is less than 0.20 weight percent, more preferably less than 0.10 weight percent, and most preferably less than 0.050 weight percent of the total lubricant, a sulfur and/or phosphorous containing extreme pressure agent that is less than 0.10 weight percent, more preferably less than 0.030 weight percent, and most preferably less than 0.010 weight percent of the total lubricant, a nitrogen, sulfur, phosphorous, and/or molybdenum containing antioxidant that is less than 0.050 weight percent, more preferably less than 0.030 weight percent and most preferably less than 0.010 weight percent of the total lubricant, a defoaming agent that is less than 0.002 weight percent or 20 ppm and most preferably 0 percent or 0 ppm of the total lubricant. More specifically, in the total lubricant, the concentration of phosphorous should be less than 500 ppm with a preferred range of less than 10 ppm. The concentration of zinc should be less than 500 ppm with a preferred range of less than 10 ppm. The concentration of nitrogen should be less than 100 ppm with a preferred range of less than 10 ppm. The concentration of sulfur should be less than 20 ppm with a preferred range of less than 5 ppm. The concentration of molybdenum should be less than 10 ppm with a preferred range of less than 2 ppm. The concentration of boron should be 10 ppm with a preferred range of less than 100 ppb (parts per billion). The concentration of silicon should be less than 1 ppm with a preferred concentration of less than 100 ppb.

It is obvious to those skilled in the art that these are only a few general and accepted examples of additive compounds and that there may exist other related compounds or classes of compounds that do not interfere with the spirit of this invention.

BRIEF DESCRIPTION OF THE DRAWINGS

The features and advantages of the invention will be appreciated upon reference to the following drawings, in which:

FIG. 1 is a schematic view of a wind turbine operating according to the invention.

DESCRIPTION OF ILLUSTRATIVE EMBODIMENTS

The following is a description of a prophetic embodiment of the invention, given by way of example only and with reference to FIG. 1 which shows a wind turbine 10 comprising a nacelle 12 and a rotor 14. The nacelle 12 houses a gearbox 16 including a low-speed input stage planetary gear 18, a bearing 20 and a high speed gear stage 22. Further intermediate stages may be present (not shown). As will be understood, the design of such a gearbox is relatively complex but is otherwise conventional and its design is largely unrelated to the present invention. Details of the gearbox design may be found in publications such as Recommendation to Comply with the Technical Criteria of the Danish Wind Turbine Certification Scheme Gearboxes, 2007 Danish Energy Authority or the Vestas Mechanical Operating and Maintenance Manual V90-3.0 MW, VCRS 60 Hz, 2007.

In addition to the gearbox 16, the nacelle 12 houses a lubrication circuit 24 comprising an inline pump 26, an inline filter 28 and an oil cooler 30 arranged in series with one another, whereby the inline filter 28 is arranged at a high pressure side of the inline pump 26. The inline filter may consist of one to four or more filters in a parallel arrangement. This arrangement is designed to control the pressure drop between the inlet of the first filter and the outlet of the last filter. In parallel to the lubrication circuit 24 is an offline filter system 32 comprising an offline pump 34, an offline particle filter 36 and an offline water absorption filter 38. A dry air system 40 supplies dry air at an overpressure to the gearbox 16 and a dry air breather 42 communicates with the exterior of the nacelle 12. A magnetic filter 44, is located in a sump region 46 of the gearbox 16.

Unlike conventional gearboxes, the gear elements of the low speed input gear stage 18 have mating surfaces, in particular gear teeth, that are superfinished using an isotropic planarizing technique according to the REM® process available from REM Chemicals of Brenham Tex. The resulting surfaces are of mirror-like smoothness having a roughness value Ra of less than about 0.1 micron. Due to the exceptional surface finish, the low speed gear stage is able to operate in mixed or full elasto-hydrodynamic lubrication mode even at the relatively low operational speeds encountered.

The lubrication circuit 24 and gearbox 16 are filled with a quantity of about 200 liters of lubricant as described in further detail below, having an ISO viscosity grade of 150. This lubricant is considered to have adequate viscosity to prevent scuffing and wear in the superfinished low speed gear 18 without being of too high viscosity for the bearing 20 and high speed gear stage 22.

The inline pump 26 circulates the lubricant from the gearbox 16 through the inline filter 28 at a rate of approximately 106 liters per minute. The inline filter 28 is a surface filter a Triboguard™ Synteg™ XP or similar from Donaldson Company comprising glass fiber and having a $\beta_{2[c]}$ ≥1000 based on particles sizes equal to or greater than 2 micron. For such filters, the $\beta_{x[c]}$ value is defined as the ratio of particles greater than a given size "x" upstream of the filter to the number of particles of that size downstream of the filter. This means that 99.9% of all particles greater than 2 microns are retained by the filter.

Under normal circumstances, a filter of this caliber would rapidly become clogged with lubricant debris and would exhibit high pressure loss due to the conventional gearbox oils of ISO VG 320. In the present case however it is expected that the inline filter will operate satisfactorily for extended periods. This is due firstly to the reduced debris as a result of the superfinished surfaces. Secondly, the lower viscosity lubricant is more able to circulate freely through the filter.

The filtered lubricant passing out of the inline filter 28 is passed through the oil cooler 30 before being returned to the gearbox 16 where it is delivered directly to the bearing 20 and input gear stage 18.

In addition to the lubrication circuit 24, the offline filter system 32 circulates a relatively smaller volume of lubricant from the gearbox 16 in parallel to the lubrication circuit 24. The offline pump 34 circulates on a continuous basis a quantity of approximately 40 liters per minute at 50 Hertz or 48 liters per minute at 60 Hertz from the sump region 46 and returns the lubricant to the gearbox via the offline particle filter 36 and the offline water absorption filter 38. The offline particle filter 36 is a still finer filter than the inline filter 28 and is calibrated to remove particles below 1 micron. Because it is not in the direct lubrication flow to the critical surfaces of the gears 18, 22 and bearings 20, a possible blockage of the filter would not be catastrophic to operation of the wind turbine 10. Appropriate monitoring (not shown) provides warning to service personnel in the event that such blockage occurs whereby the offline filter component may be changed without otherwise affecting operation of the wind turbine 10.

Offline water absorption filter 38 removes entrained water from the lubricant on a continuous basis. The offline water absorption filter 38 is a depth filter available from C.C. Jensen A/S. The skilled person will readily understand that additional and alternative filter components may be included within the offline system as system requirements dictate.

In addition to air removal by the offline water absorption filter 38, dry air system 40 provides a constant stream of ultra-dry air to the interior of the gearbox. The slight overpressure produced by this supply substantially eliminates atmospheric air ingress to the gearbox via other routes. The dry air breather 42 is a REGEN8™ self reactivating dry air breather available from Brownell Ltd, London which actively adsorbs moisture entering the gearbox. When the adsorbent is saturated an automatic reactivation process is initiated which restores the adsorbent to its maximum efficiency level. In order to further protect the interior of the gearbox from external particulates, the dry air breather 42 also includes a 1 micron air filter.

The magnetic filter 44 is generally conventional and is located in the sump area 46 of the gearbox 16 in a position where lubricant is drawn towards the lubricant circuit 24 by action of the inline pump 26. As the lubricant flows past the magnetic filter 44, ferrous debris particles are attracted to and become attached to the magnetic filter 44. Because of the reduced viscosity of the lubricant compared to conventional lubricants, movement of such debris particles is more rapid and the effectiveness of the magnetic filter 44 is increased.

The lubricant used in the above embodiment is produced according to the following example:

The complete lubricant comprises 99.54 percent poly-alpha-olefin (PAO) base oil having a viscosity of ISO VG 150 and a 0.46 weight percent additive package diluted in the base oil. The diluted additive package comprises of 0.030 weight percent zinc di-(heptylphenyl) dithiophosphate antiwear compound that also functions as an anti-micropitting, anti-scuffing and extreme pressure compound, 0.010 weight percent zinc di-(1,3-dimethylbutyl) dithiophosphate extreme pressure compound that also functions as an anti-wear, anti-micropitting and anti-scuffing compound, 0.0050 weight percent 2,4,6-tri-tertbutylphenol antioxidant compound. In addition, the diluted lubricant additive package concentrate comprises 0.01 weight percent sodium petroleum sulfonate anti-corrosion or anti-rust compound, 0.3 weight percent non-boron containing polybutenylsuccinimide dispersant compounds and a 0.10 weight percent polyoxyethylene alkyl phenyl ether demulsifier.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention.

What is claimed is:

1. A gearbox system for a wind turbine rated to a capacity of more than 1 MW, comprising:
    an input gear stage operating at less than 60 rpm and having mating gear surfaces finished to a surface roughness Ra of less than 0.25 micron;
    at least one bearing supporting the input gear stage;
    a lubrication circuit arranged to deliver lubricant to the input gear stage and the bearing during operation of the wind-turbine and comprising an inline 2 micron filter; and
    a quantity of lubricant in the lubrication circuit, the lubricant having an ISO VG of between 100 and 220.

2. The system of claim 1, wherein the lubricant has an ISO VG around 150.

3. The system of claim 1, further comprising a high-speed gear stage, wherein the high speed gear stage comprises mating gear surfaces finished to a surface roughness Ra of less than 0.25 micron.

4. The system of claim 1, further comprising a high-speed bearing, wherein the high speed bearing comprises one or more individual bearings finished to a surface roughness Ra of less than 0.25 micron.

5. The system of claim 1, wherein the wind-turbine gearbox system is rated to a capacity of more than 1.5 MW.

6. The system of claim 1, wherein the lubrication circuit comprises a pump and the inline filter is located on a high-pressure side of the pump.

7. The system of claim 1, wherein the inline filter is a surface filter comprising glass fiber, modified glass fiber, metal, or a polymer.

8. The system claim 1, further comprising an offline filter connected in parallel to the inline filter.

9. The system of claim 1, further comprising a magnetic filter.

10. The system of claim 9, wherein the magnetic filter is located in a sump region of the gearbox.

11. The system of claim 1, wherein the mating gear surfaces are planarized having an average peak to mean height roughness Rpm of 1 micron or less.

12. The system of claim 1, wherein the mating gear surfaces are planarized having an average peak to mean height roughness Rpm of 0.50 micron or less.

13. The system of claim 1, wherein the mating gear surfaces are chemically accelerated vibratory finished surfaces.

14. The system of claim 1, wherein the lubricant comprises more than 85% mineral or synthetic base oil.

15. The system of claim 1, wherein the lubricant comprises more than 95% mineral or synthetic base oil.

16. The system of claim 1, wherein the lubricant comprises more than 99% mineral or synthetic base oil.

17. The system of claim 1, wherein the lubricant is at least substantially free of a defoaming agent.

18. The system of claim 1, wherein the lubricant has a concentration of phosphorous of less than 500 ppm.

19. The system of claim 1, wherein the lubricant has a concentration of phosphorous of less than 10 ppm.

20. The system of claim 1, wherein the lubricant has a concentration of zinc of less than 100 ppm.

21. The system of claim 1, wherein the lubricant has a concentration of zinc of less than 10 ppm.

22. The system according claim 1, wherein the lubricant has a concentration of nitrogen of less than 100 ppm.

23. The system according claim 1, wherein the lubricant has a concentration of nitrogen of less than 10 ppm.

24. The system of claim 1, wherein the lubricant has a concentration of sulphur of less than 20 ppm.

25. The system of claim 1, wherein the lubricant has a concentration of sulphur of less than 5 ppm.

26. The system of claim 1, wherein the lubricant has a concentration of molybdenum of less than 10 ppm.

27. The system of claim 1, wherein the lubricant has a concentration of molybdenum of less than 2 ppm.

28. The system of claim 1, wherein the lubricant has a concentration of boron of less than 10 ppm.

29. The system of claim 1, wherein the lubricant has a concentration of boron of less than 100 ppb.

30. The system of claim 1, wherein the lubricant has a concentration of silicon of less than 10 ppm.

31. The system of claim 1, wherein the lubricant has a concentration of silicon of less than 100 ppb.

* * * * *